June 10, 1947.　　　D. M. RICHEY ET AL　　　2,421,807
EXPLOSIVE-RELEASE MECHANISM
Filed April 26, 1945　　　2 Sheets-Sheet 1
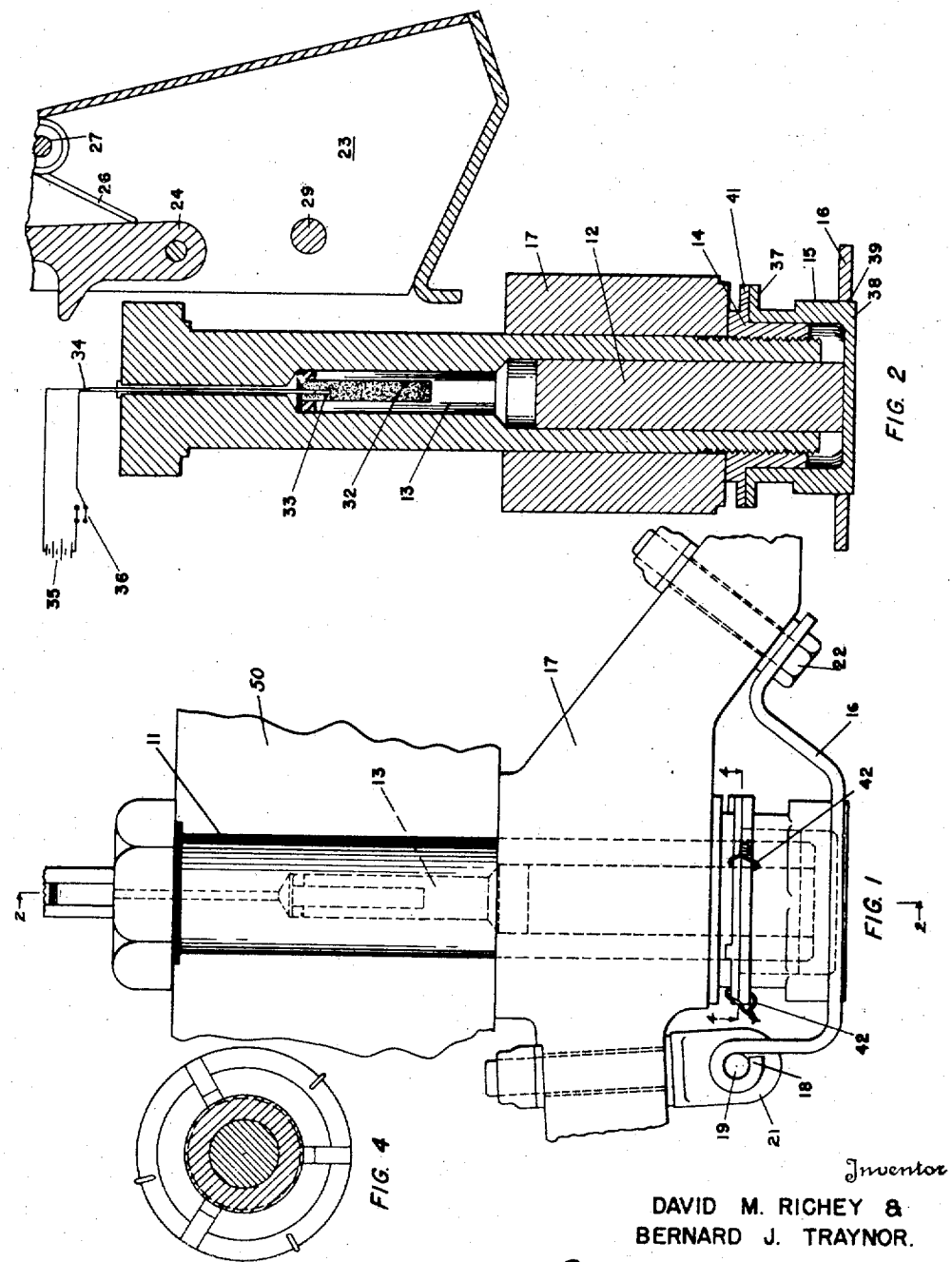
Inventor
DAVID M. RICHEY &
BERNARD J. TRAYNOR.
By Ralph L Chappell
Attorney

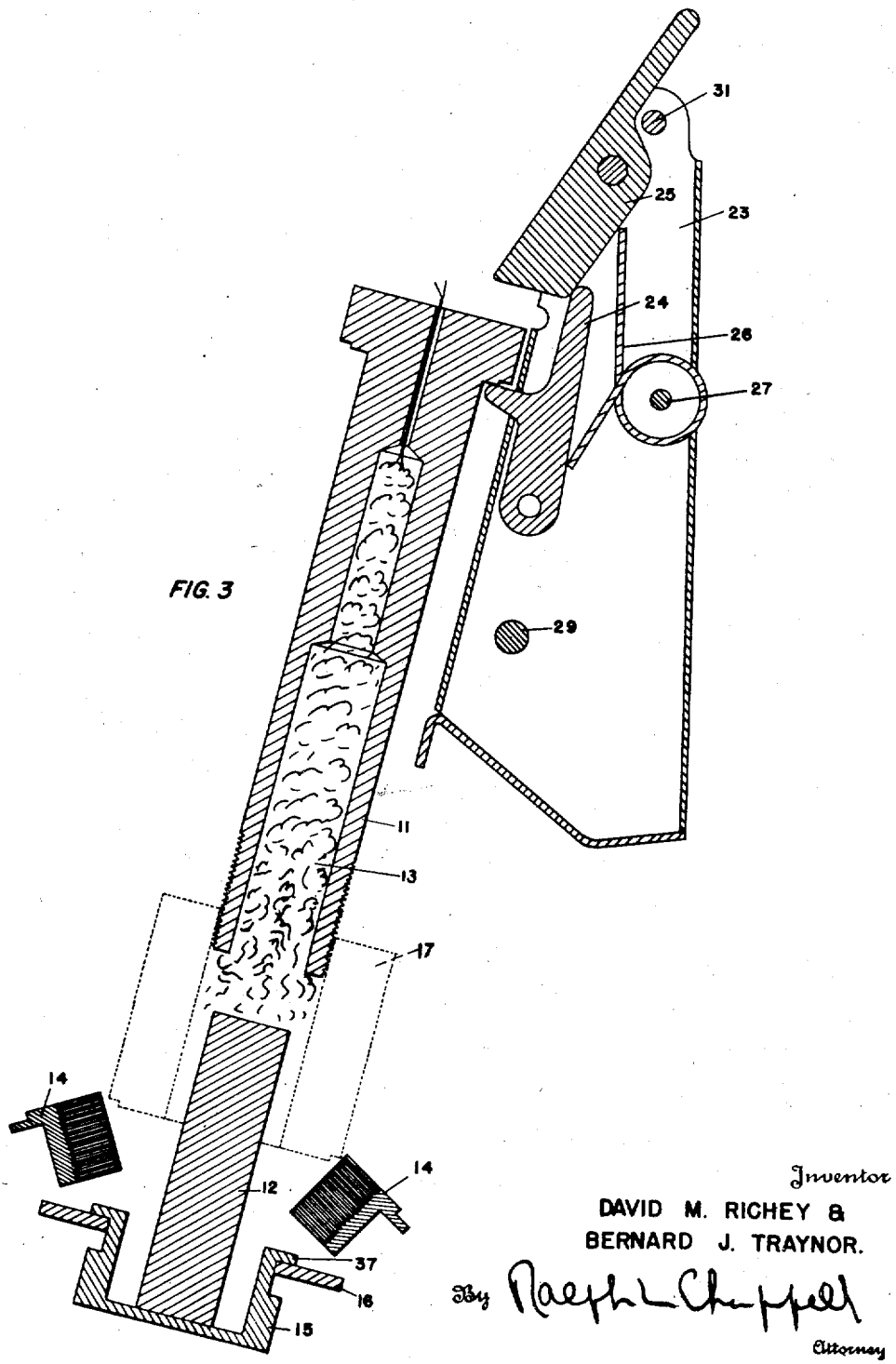

Patented June 10, 1947

2,421,807

UNITED STATES PATENT OFFICE 2,421,807

EXPLOSIVE-RELEASE MECHANISM

David M. Richey, Devon, and Bernard J. Traynor, Bridgeport, Conn., assignors to United Aircraft Corporation, East Hartford, Conn., a corporation of Delaware Application April 26, 1945, Serial No. 590,412

3 Claims. (Cl. 89—1.5)

This invention relates to a quick release mechanism and, in particular, an apparatus to be utilized for jettisoning quickly and effectively equipment such as fuel tanks, bombs and the like from aircraft while in flight.

Heretofore, various types of release mechanisms have been employed, but, due to some inherent defects therein, have not been completely effective in causing the equipment to be jettisoned at the instant desired. This has been particularly true in many instances where the usual type bomb-supporting releasable mechanism has been disengaged but by reason of friction or faultily operable parts, the bombs have been caused to become hung up in the mechanism, and, since their positions on the airplane are usually such as to make it practically impossible to jettison them forcibly therefrom, they become a very definite hazard when the aircraft is brought in for a landing.

It is one object of this invention, therefore, to provide a quick release explosive operable mechanism adapted to be employed in supporting equipment to be jettisoned from an aircraft while in flight.

Another object of this invention is to provide a quick release mechanism which may be readily installed in standard aircraft for securing equipment thereto to be jettisoned from the craft while in flight.

Still another object of this invention is to provide a quick release mechanism adapted to be operated instantly and without effort by merely closing a switch so that the attention of the pilot, which may be required elsewhere at that instant, will not be unnecessarily diverted.

These, as well as the various other novel features and advantages of this invention, will become apparent from a reading of the specification and the accompanying drawings of which:

Fig. 1 is a side elevation view of the mechanism installed in an aircraft showing a portion of a supporting bracket attached to equipment to be jettisoned from the craft while in flight;

Fig. 2 is a sectional view taken at 2—2 of Fig. 1 showing the latch mechanism adapted to cooperate with the explosive release mechanism when equipment is jettisoned;

Fig. 3 illustrates the mechanism in the completely released position; and

Fig. 4 is a sectional view taken at 4—4 of Fig. 1.

With reference to Figs. 1 and 2, the explosive release mechanism comprises a bolt 11 slidably supported in a portion of the aircraft structure 50, the details of which are not shown, plunger 12, recess 13, segmental nut 14, cap 15, and cap retaining member 16 suitably secured to equipment supporting casting 17 by hinge 18 pivoted at one end by means of a pin 19 passing through the head end of a bolt 21 and latched in position at the opposite end by bolt 22.

A latching mechanism, Figs. 2 and 3, the purpose of which will be explained hereinafter, consists of a frame 23 with a pivotal latch 24 and a pivotal stop 25 mounted therein, both latch and stop being urged to their outward positions by spring 26 suitably supported in frame 23 by pin 27. The frame 23 is secured to a suitable support within the aircraft by bolts 29 and 31, as shown in Fig. 3.

With reference to Fig. 2, the recess 13 in bolt 11 contains an explosive charge 32 within which is positioned a detonator 33 secured to a pair of wires 34 which in turn are connected in an electrical circuit comprising a battery 35 and switch 36. Cap 15, having outwardly extending flange 37 at the open end thereof, is hexagonally shaped at the opposite end 38 to fit within hexagonal opening 39 of cap retaining member 16. Segmental nut 14, provided with flange 41 is secured to cap 15 by means of safety wires 42 to prevent accidental displacement of cap 15.

This supporting device operates essentially in the following fashion: When the electrical circuit is completed by closing switch 36, the detonator 33 causes charge 32 to explode, yielding energy which transmits motion to plunger 12, which in turn expends the energy transmitted thereto against the end of cap 15, severing safety wires 42 so that the cap 15 is carried downward until the flange 37 strikes the edges of the hexagonal opening of retaining member 16. Thus, since the retaining members have been removed, the segmental nut 14 is released from the threaded end of bolt 11, permitting the bolt 11 to be driven upwardly. The head end of the bolt strikes latch 24, and, after causing it to swing back against the reaction of spring 26, strikes stop 25. As soon as the head clears the latch, the latch is forced back, preventing the bolt from returning to its former position. Thus, by reason of withdrawal of the supporting bolt 11, the casting 17 and the load supported thereby is released and jettisoned from the aircraft.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

We claim:

1. A mechanism for releasing equipment from aircraft comprising a load supporting hollow bolt, means for securing said bolt to said aircraft and to equipment to be jettisoned therefrom, said means comprising a segmental nut encompassing the threaded end of said bolt and a cap adapted to be passed over said segmental nut for retaining said nut in the bolt engaging position, safety means for retaining said cap in the nut engaging position, an explosive charge secured within said hollow bolt for insuring disengagement of said cap from said nut and a shock distributing member within said bolt interposed between said charge and said cap.

2. A mechanism for releasing equipment from aircraft comprising a load supporting hollow bolt, means for securing said bolt to said aircraft and to equipment to be jettisoned therefrom, said means comprising a segmental flanged nut encompassing the threaded end of said bolt and a flanged cap adapted to be passed over said segmental nut for retaining said nut in the bolt engaging position, an explosive charge secured within said hollow bolt for insuring disengagement of said cap from said nut and a shock distributing member within said bolt interposed between said charge and said cap, and safety means engaging the flanges of said cap and said nut for retaining said cap in the nut engaging position.

3. A mechanism for releasing equipment from aircraft comprising a rigid member for suspending said equipment from said aircraft, a member slidably mounted on said rigid member for supporting said equipment, a first means positively engaging said rigid member and retaining said supporting member on said rigid member, a second means slidably mounted on said first means and adapted to hold said first means in engagement with said rigid member while so mounted, said second means being attached to said first means by frangible safety elements, an explosive charge secured within said rigid member, and a shock distributing member within said rigid member interposed between said charge and said second member and adapted to distribute the shock of explosion to said second member resulting in sequence in the breaking of the safety elements, disengagement of said second means from said first means, disengagement of said first means from said rigid member and release of said equipment.

DAVID M. RICHEY.
BERNARD J. TRAYNOR.

REFERENCES CITED

The following references are of record in the file of this patent:

UNITED STATES PATENTS

| Number | Name | Date |
|---|---|---|
| 2,161,082 | Ovtschinnikoff | June 6, 1939 |
| 1,191,375 | Van Keuren | July 18, 1916 |
| 1,725,473 | Page | Aug. 20, 1929 |

FOREIGN PATENTS

| Number | Country | Date |
|---|---|---|
| 1,232 | Netherlands | Mar. 22, 1916 |